United States Patent
Olds

[15] 3,646,306
[45] Feb. 29, 1972

[54] ARC GOUGING SYSTEM

[72] Inventor: Edwin W. Olds, 3105 High Street, Oakland, Calif. 94619

[22] Filed: Apr. 24, 1970

[21] Appl. No.: 31,607

[52] U.S. Cl. ............................219/70, 219/146, 252/503
[51] Int. Cl. ..........................................................B23k 9/16
[58] Field of Search ...............219/69 F, 69 M, 69 V, 70, 146; 252/503

[56] References Cited

UNITED STATES PATENTS

| | | | |
|---|---|---|---|
| 828,544 | 8/1906 | Gerard | 252/503 |
| 1,525,840 | 2/1925 | Weed | 219/146 |
| 3,030,544 | 4/1962 | Zamboldi et al. | 219/70 |
| 3,053,966 | 9/1962 | Landis | 219/69 V |
| 3,187,154 | 6/1965 | Stepath | 219/70 |
| 3,345,495 | 10/1967 | Quaas et al. | 219/146 |

*Primary Examiner*—R. F. Staubly
*Attorney*—Gregg, Hendricson & Caplan

[57] ABSTRACT

An air arc gouging system having means continuously feeding a thin walled tube filled with finely divided graphite as a flexible electrode into an arc to a workpiece and means directing gas at a high velocity on to the workpiece at the arc. A substantial length of electrode is coiled or wound as upon a drum for extended continuous gouging operations.

1 Claims, 4 Drawing Figures

PATENTED FEB 29 1972

3,646,306

INVENTOR.
EDWIN W. OLDS
BY
Gregg Hendricks & Caplan
ATTORNEY

3,646,306

ARC GOUGING SYSTEM

BACKGROUND OF INVENTION

Although it has long been conventional to accomplish the joinder of pieces of metal by electric arc welding, it is only within relatively recent years that the removal of metal by an arc has received widespread acceptance. In the process of arc welding the material of the electrode employed as one end of the arc is deposited upon the pieces to be joined forming the other end of the arc. Alternatively in the removal of metal by an arc, it is definitely not desired to deposit electrode material and to this end there have been developed a variety of different arc gouging systems.

One commercially available air arc gouging system utilizes carbon electrodes or rods with one or more air jets to remove material melted by the arc. While this system employs carbon, graphite and the like to minimize consumption of the arc electrode, it is realized that some consumption of the electrode does occur. Various mechanical improvements have been made in this system to the end of minimizing problems and difficulties involved in the replacement of the carbon electrodes. In this respect reference is made, for example, to U.S. Pat. No. 3,030,544 and subsequent U.S. Pat. No. 3,399,322 disclosing structures for arc electrodes whereby successive electrode rods may be joined together. It has long been recognized that some type of continuous arc electrode would be highly advantageous and the above-mentioned patents are exemplary of attempts to solve this problem.

As an alternative to the utilization of carbon electrodes in arc applications wherein the deposition of metal is not desired, there have been developed certain arc cutting improvements employing ferrous wires. One example of an improvement of this nature is to found in U.S. Pat. No. 3,053,966 which is particularly directed to the field of arc cutting and which employs a fine iron or steel wire. In order to limit metal deposition from the arc electrode, it has been proposed to utilize a very thin wire which, however, suffers from the disadvantage of requiring a relatively rapid electrode feed. It is, of course, possible with a conventional flexible wire electrode to continuously feed the electrode to the arc but this involves not only the above problem but various others recognized in the field.

In general, arc cutting or gouging has previously been limited either to the utilization of rigid carbon rods or to continuously fed small iron wires. The present invention provides the advantage of continuous feed with a flexible electrode while at the same time providing such electrode primarily as a graphite or carbon material. This then combines the advantages of the two prior art approaches noted above.

SUMMARY OF INVENTION

In brief, the present invention provides an arc gouging system incorporating a flexible and primarily nonmetallic electrode. Relatively conventional provisions are made for blanketing the arc with a gas and for forcibly removing metal melted by the arc either by the force of the blanketing gas or through the media of an auxiliary gas jet. The arc electrode hereof is formed as a very thin walled metallic tube containing therein a core formed primarily at least of graphite provided in powdered form and prevented from falling from an open tube end by provision of a suitable binder. The thin walled metallic tube provides the requisite containment and flexibility for a continuously fed electrode in that same may be wound about reels or the like for storage and transportation and may also be fed in the manner of a wire or the like between rollers or other drive means to continuously present electrode material to one end of an arc. There is thus achieved the advantage of the carbon electrode which is much less consumable than an iron or steel electrode together with the advantage of flexibility of the electrode for continuous feed thereof.

The present invention may also incorporate within the core of the flexible electrode hereof a variety of additives such as particular metals to raise the arc temperature and the like.

DESCRIPTION OF FIGURES

The present invention is illustrated as to a particular preferred embodiment thereof in the accompanying drawing wherein.

DESCRIPTION OF PREFERRED EMBODIMENT

Figure 1:
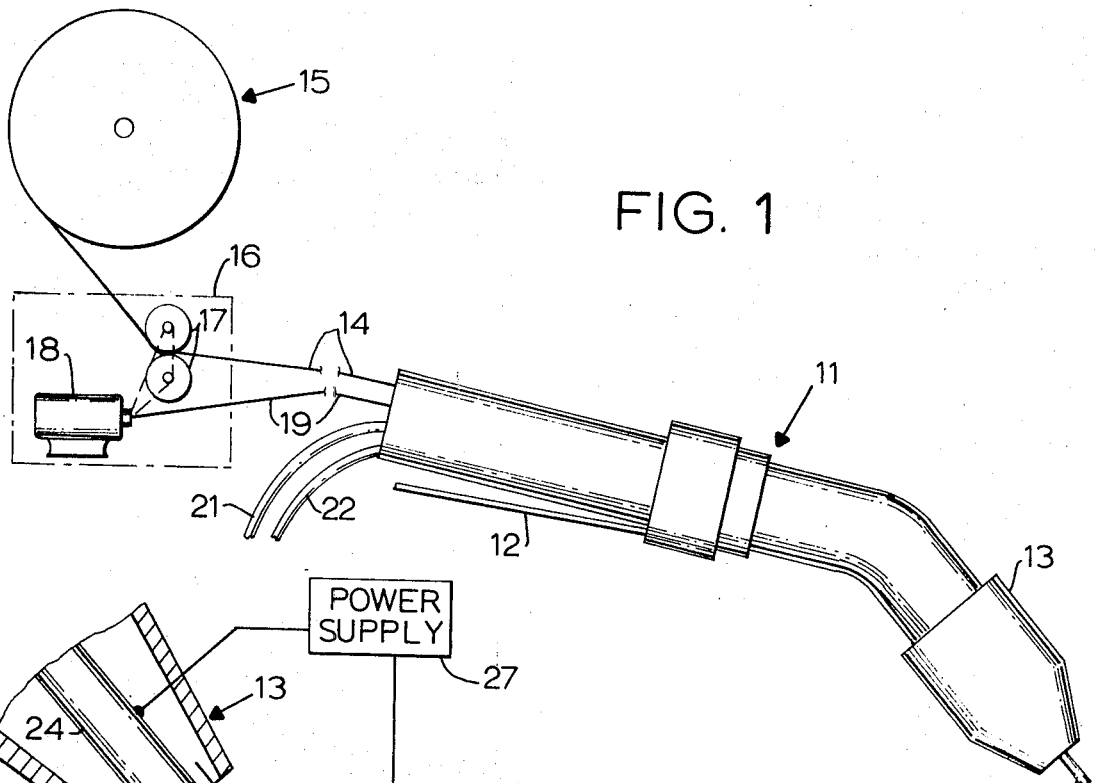
FIG. 1 is a schematic illustration of an air arc gouging system in accordance with the present invention.

Referring first to FIG. 1 of the drawing, there will be seen to be illustrated basic elements of a conventional arc gouging system. A torch 11 is provided at a handle thereof with a trigger switch 12 for operating the torch and includes a head 13 from which extends an electrode 14 for establishing an arc. This electrode 14, as described in detail below, is relatively nonconsumable but in view of the necessary limited consumption of the electrode by the arc, there is provided a supply of electrode in a reel 15 which may be located at some distance from the torch. Provision is made for feeding the electrode from the reel through the torch and this may, for example, comprise a control unit 16 disposed adjacent the reel and including drive rolls 17 operated by a motor 18. A motor control line 19 extends from the torch to the motor for operation by the switch 12 under control of the one using the torch.

In addition to the foregoing portions of the system, there is also provided electrical connections 21 extending from the torch to a suitable power supply for establishing and maintaining an arc. There is also provided in extension from the torch a flexible gas line 22 extending to some pressurized gas reservoir for purposes described in more detail below.

Figure 2:
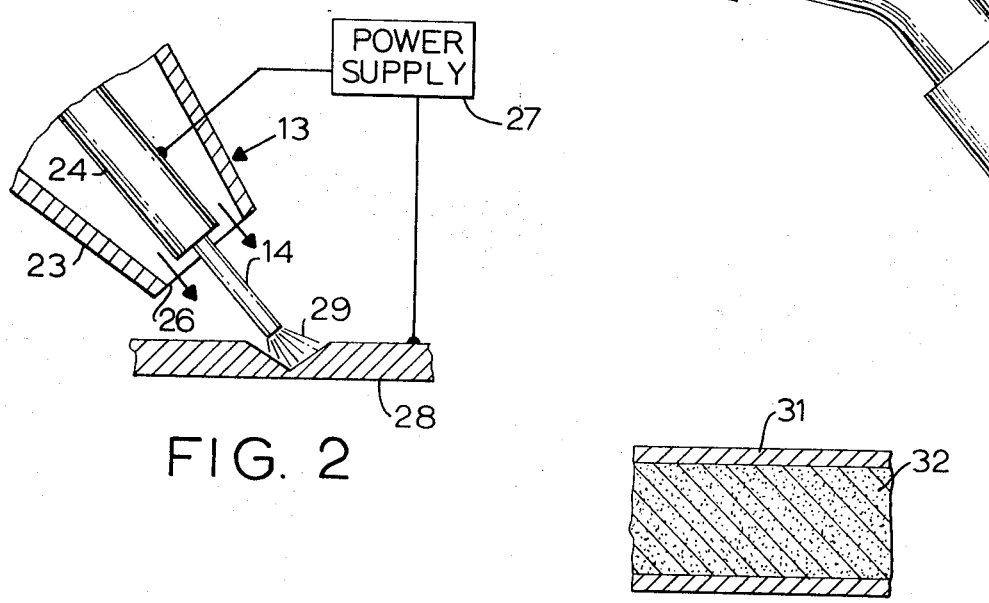
FIG. 2 is a partial longitudinal sectional view of the arc end of an arc gouging gun that may be employed in accordance with the present invention.

Referring now to FIG. 2 of the drawing, there will be seen to be illustrated the outer end of the torch nozzle or head 13 which includes a gas cup 23 about a central contact tip 24 having the electrode 14 extending axially therethrough and from the open end of the head 13. One or more openings 26 are provided about the contact tip at the lower end of the gas cup 23 for the passage of gas under pressure outwardly along the electrode 14 extending from the end of the tip. A power supply 27 is connected between the electrically conducting contact tip 24 and a work piece 28, as schematically illustrated in FIG. 2, and this then establishes an arc 29 between the outer end of the electrode 14 and the workpiece.

In operation, arc gouging is accomplished by the establishment of an arc between the end of a relatively nonconsumable electrode and a workpiece from which metal is to be removed. One or more high-pressure jets of gas or air is directed from the tip of the torch onto the metal being melted by the arc on the workpiece. This is schematically illustrated by the small arrows in FIG. 2. Such gas, when provided as an inert gas, prevents oxidation of the electrode and, whether provided as an inert gas or air, for example, the high-velocity jet thereof operates to blow molten metal from the workpiece as it is melted by the arc.

Control over arc gouging is available at the torch by the trigger switch 12 which serves, for example, to electrically connect a power supply to the electrode 14 and at the same time to feed the electrode at the requisite rate from the tip of the torch. Feeding of the electrode, as described in more detail below, is controlled by the control line 19 extending to the roller drive motor 18. It is noted that the feed of electrode may be incorporated in the torch itself with the drive motor and rollers being located in the handle, for example. Some arc gouging guns are so constructed.

It is to be appreciated that arc gouging or metal removal by an arc is accomplished by the provision of relative movement between an arc electrode and a workpiece so that the arc impinges upon successive portions of the workpiece to perform the gouging operation.

It is to be appreciated that the system illustrated in FIGS. 1 and 2 are only generally illustrative of the principles of arc gouging wherein metal is removed by the action of an arc with a relatively unconsumable arc electrode. No attempt is made to illustrate or describe all possible mechanical elements involved but instead reference is briefly made to basic portions of such a system. With regard to the accomplishment of arc gouging, it is to be recognized that arc gouging equipment may be operated by hand or automatically. Thus, it is possible to set up an arc gouging system through which metallic pieces are passed for removal of metal therefrom. Alternatively, it is possible to operate such a system by hand through the manual location of the arc electrode.

Figure 4:
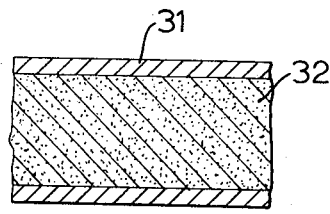
FIG. 4 is a sectional view in the plane 4—4 of FIG. 3.
Figure 3:
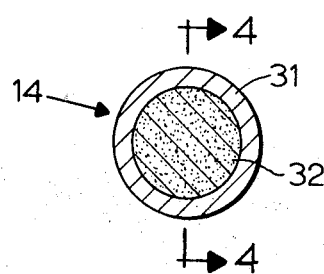
FIG. 3 is a transverse sectional view of the flexible electrode of the present invention.

Of particular importance with regard to the present invention is the composition of the electrode employed herein. Rather than utilizing a stiff carbon rod as in some prior art applications or a thin iron wire as in others, the present invention provides a composite electrode having the advantages of low consump,ion afforded by graphite or carbon material and the flexibility of a thin wire. Such an electrode is schematically illustrated in FIGS. 3 and 4 as comprising a metallic tube 31 that is relatively thin walled so as to be at least limitedly flexible over a length thereof. Within the tube there is provided a core or the like 32 formed primarily at least of carbon or graphite in finely divided form so that the core is limitedly flexible with the tube. This core 32 is, as noted above, primarily composed of carbon or graphite in powdered or relatively finely divided form and may include one or more suitable binders holding together particles of carbon or graphite so that they cannot fall from the open end of the tube. This binder may be comprised of any one of a large variety of different materials such as plastics or the like inasmuch as the sole function of the binder is to hold together the particles of carbon or graphite.

There may additionally be provided as a portion of the core 32 certain additives that are particularly applicable for certain applications of the electrode. Thus, for example, certain types of finely divided metal may be added to the core material or, alternatively, the tube wall may in fact be thickened to increase the proportion of metal to graphite per unit length of the electrode. It is known that certain metals may be employed in powdered form to raise the temperature of an arc such as, for example, aluminum or magnesium and it is contemplated that these and other metals may be added to the electrode core hereof as required or as may be advantageous for particular applications.

Additional variations are possible such as the inclusion of materials for arc stabilization and also the formation of the exterior tube of nonmetallic material as well as from a metal. It is even possible to form the tube at the time of use. Thus a ribbon, for example, of a metallic or nonmetallic material may be formed into a U-shape with core material being placed therein and the free edges of the U folded together to form the tube as it passes into the arc gouging head through drive means. Various manners of handling this type of electrode are possible and similarly there are various alternatives in the manner of maintaining the core material within the tube, for at least under certain circumstances it may even be advisable to incorporate in the core material some heat-responsive binder such that the core material would solidify at some distance from the arcing end of the electrode by heat conduction so that at no time would there be exposed at the electrode end core material in such a form that it could fall from the tube.

It is to be appreciated that the arc gouging electrode of the present invention is only limitedly consumable much in the manner of a carbon or graphite rod or stick formerly employed for arc gouging. Thus the problem of metal deposition during arc gouging is precluded hereby and, furthermore, prior art problems of relatively high-speed electrode feed when employing wire electrodes is not present in the present invention. There is thus attained hereby the dual advantage of relatively nonconsumable electrodes together with the capability of continuous feed of such electrodes.

What is claimed is:

1. An arc gouging system comprising:
   an elongated thin walled tube of limited flexibility,
   a core of finely divided material primarily comprising graphite and a metal chosen from the group of aluminum and magnesium with a binder disposed in said tube to thus constitute the filled tube as a flexible arc electrode,
   power supply means electrically connected to said electrode and adapted for connection to a workpiece for establishing an arc therebetween,
   means controllably feeding said electrode into the arc as the electrode is consumed and including electrode storage and bending means, and
   means directing a gas at high velocity onto the workpiece at the arc to remove material melted by the arc.

* * * * *